United States Patent
Bar-Nahum et al.

(10) Patent No.: US 10,325,169 B2
(45) Date of Patent: Jun. 18, 2019

(54) SPATIO-TEMPORAL AWARENESS ENGINE FOR PRIORITY TREE BASED REGION SELECTION ACROSS MULTIPLE INPUT CAMERAS AND MULTIMODAL SENSOR EMPOWERED AWARENESS ENGINE FOR TARGET RECOVERY AND OBJECT PATH PREDICTION

(71) Applicant: Airspace Systems Inc., San Leandro, CA (US)

(72) Inventors: Guy Bar-Nahum, Sausalito, CA (US); Hoang Anh Nguyen, San Mateo, CA (US); Jasminder S. Banga, San Francisco, CA (US)

(73) Assignee: Airspace Systems, Inc., San Leandro, CA (US)

( * ) Notice: Subject to any disclaimer, the term of this patent is extended or adjusted under 35 U.S.C. 154(b) by 0 days.

(21) Appl. No.: 15/729,581

(22) Filed: Oct. 10, 2017

(65) Prior Publication Data

US 2018/0101744 A1    Apr. 12, 2018

Related U.S. Application Data

(60) Provisional application No. 62/405,970, filed on Oct. 9, 2016, provisional application No. 62/405,972, filed on Oct. 9, 2016.

(51) Int. Cl.
*G06K 9/00* (2006.01)
*G06K 9/20* (2006.01)
(Continued)

(52) U.S. Cl.
CPC ....... *G06K 9/00993* (2013.01); *G06K 9/0063* (2013.01); *G06K 9/00718* (2013.01);
(Continued)

(58) Field of Classification Search
None
See application file for complete search history.

(56) References Cited

U.S. PATENT DOCUMENTS 7,995,794 B2 * 8/2011 Hope ..................... G03B 17/38
382/103
9,031,280 B2 * 5/2015 Pakulski ............... G06T 7/2053
348/169
(Continued)

*Primary Examiner* — Randolph I Chu
(74) *Attorney, Agent, or Firm* — Van Pelt, Yi & James LLP

(57) ABSTRACT

A spatio-temporal awareness engine combines a low-resolution tracking process and high resolution tracking process to employ an array of imaging sensors to track an object within the visual field. The system utilizes a low-resolution conversion through noise filtering and feature consolidation to load-balance the more computationally-intensive aspects of object tracking, allowing for a more robust system, while utilizing less computer resources. A process for target recovery and object path prediction in a robotic drone may include tracking targets using a combination of visual and acoustic multimodal sensors, operating a camera as a main tracking sensor of the multimodal sensors and feeding output of the camera to a spatiotemoral engine, complementing the main tracking sensor with non-visual, fast secondary sensors to assign rough directionality to a target tracking signal, and applying the rough directionality to prioritize visual scanning by the main tracking sensor.

21 Claims, 14 Drawing Sheets

(51) Int. Cl.
*G06K 9/40* (2006.01)
*G06T 7/246* (2017.01)
*G06T 7/292* (2017.01)

(52) U.S. Cl.
CPC ............. *G06K 9/2054* (2013.01); *G06K 9/40* (2013.01); *G06T 7/248* (2017.01); *G06T 7/292* (2017.01); *G06K 9/00973* (2013.01); *G06K 2209/21* (2013.01); *G06T 2207/10016* (2013.01); *G06T 2207/10032* (2013.01); *G06T 2207/30232* (2013.01)

(56) References Cited

U.S. PATENT DOCUMENTS

| | | | |
|---|---|---|---|
| 9,412,278 | B1 | 8/2016 | Gong |
| 2002/0196330 | A1* | 12/2002 | Park ................. G08B 13/19608 348/49 |
| 2005/0021282 | A1 | 1/2005 | Sammut |
| 2007/0098218 | A1* | 5/2007 | Zhang ................. G06K 9/00228 382/103 |
| 2008/0252903 | A1* | 10/2008 | Boesser ................... G02B 7/38 356/614 |
| 2011/0054689 | A1 | 3/2011 | Nielsen |
| 2016/0068267 | A1 | 3/2016 | Liu |
| 2016/0127641 | A1 | 5/2016 | Gove |
| 2016/0136482 | A1 | 5/2016 | Askew, Jr. |
| 2016/0202695 | A1 | 7/2016 | Deroos |
| 2016/0219248 | A1 | 7/2016 | Reznik |
| 2016/0246297 | A1 | 8/2016 | Song |
| 2016/0253808 | A1 | 9/2016 | Metzler |
| 2016/0307447 | A1 | 10/2016 | Johnson |
| 2017/0161907 | A1 | 6/2017 | Malecki |
| 2018/0046187 | A1 | 2/2018 | Martirosyan |
| 2018/0074519 | A1 | 3/2018 | Qin |
| 2018/0164799 | A1 | 6/2018 | Hong |
| 2018/0204331 | A1 | 7/2018 | Omari |
| 2018/0218618 | A1 | 8/2018 | Rysdyk |
| 2018/0288586 | A1 | 10/2018 | Tran |
| 2018/0330623 | A1 | 11/2018 | Fujita |
| 2018/0331738 | A1 | 11/2018 | Agrawal |
| 2019/0019141 | A1 | 1/2019 | Torii |

* cited by examiner

SPATIO-TEMPORAL AWARENESS ENGINE FOR PRIORITY TREE BASED REGION SELECTION ACROSS MULTIPLE INPUT CAMERAS AND MULTIMODAL SENSOR EMPOWERED AWARENESS ENGINE FOR TARGET RECOVERY AND OBJECT PATH PREDICTION

CROSS-REFERENCE TO RELATED APPLICATIONS

This application claims the benefit of domestic priority under 35 USC 119(e) based on provisional application Nos. 62/405,970, filed Oct. 9, 2016, and 62/405,972, filed Oct. 9, 2016, the contents of which are each individually incorporated by reference in their entireties.

BACKGROUND

Autonomous robotic systems (ARS) (e.g. drones, self driving cars, etc.) require an awareness of their surroundings in order to plan their paths, avoid obstacles, and generally carry out their mission. In a specific example, an interceptor drone needs a spatial and temporal awareness to effectively detect and track an object. Such awareness is critical in providing the drone the ability to avoid other flying objects, re-detect lost target and contribute to optimal path planning. Spatial and temporal awareness requires extensive computation of sensor data representing an ARS's surroundings. Related art machine vision algorithms are typically optimized for high performance and power intensive hardware (e.g., data centers, computers on autonomous cars, etc.). However, light weight and high-speed related art ARSs have limited computing hardware and power supplies and thus cannot devote a lot of resources for vision processing. Thus there is an unmet need in the related art for systems and methods for optimization of the limited power and computing resources available onboard an ARS.

Autonomous robotic systems (ARS) tasked with detection and tracking of objects can often suffer from the lack of tracking if the target moves out of a sensor's field of view. In one example, visual detection and tracking of moving targets suffers from target loss when the target leaves a camera's viewport due to the relative movement between the target and the camera. In such situations recovery from a full loss of target from visual data alone is very unlikely if not impossible without a wide area sweep of the ARS's surroundings. This is costly both in time and computational resources and thus very undesirable. Thus there is a need for systems and methods that provide recovery of a target that are both speedy and not computationally intensive.

SUMMARY

Described herein are means for optimizing input of video data that is processed to efficiently locate and track items of interest using different processing schemes in view of effectiveness confidence and local computing resources. An example implementation includes means for determining a response direction to locate and track items of interest to respond to changes in monitored video data.

An example implementation includes method comprising optimizing resources processing a video data stream from a mobile capture device using a set of processing schemes to track one or more items of interest. A performance score is associated with each processing scheme confidence to track the one or more items of interest. The method includes repeatedly determining an active processing scheme based on the processing scheme with the highest performance score from the set of processing schemes. In response to the performance score of the active processing scheme failing to satisfy a threshold, the method selects another processing scheme to process the video data stream. Processing the video data stream can include identifying one or more items, classifying each of the items; and tracking one or more of items as an item of interest based on the classification. Processing the video data stream can include noise filtering and feature consolidation.

According to an example, selecting another processing scheme is based on determining a number of items of interest in the video data stream. The set of processing schemes can utilize different resource levels to process the video data stream. In an example, the set of processing schemes process the video data stream using different resolutions. The performance scores can be re-calculated based on a trigger, a resource threshold, or a time interval. For example, the threshold can be based on available computing resources associated with the mobile capture device.

In another example implementation, a system can include a video capture module, a sensor module, a control module, and one or more processors to direct control based on a detected change in a region of interest monitored by the video capture module or the sensor module. According to an example implementation, the one or more processors are configured to monitor multiple regions of interest in video data from the video capture module, and in response to detecting a change in a region of interest, determine a response direction for the control module based on the sensor module, wherein the response direction indicates an approximate location for an item of interest. The region of interest can include tracking an item of interest and the change in a region of interest includes not detecting the item of interest in the region of interest. For example, when an item of interest being tracked is not detected in the area of interest, the sensor module can be used to detect the response direction in view of a last detected location for the item of interest.

The system can control the video capture module, a navigation system of the control module, or feedback interface based on the response direction. For example, based on the response direction indicating an updated location for the item interest, cameras can be moved or re-focused, flight code can be updated, or visual feedback provided directed towards a possible location using the response direction. The updated location can be an approximate or predicted area based on the monitored video data and/or sensor data. The sensor module can include sensors coupled to the control module or the video capture module and/or receive sensor readings from external sensor systems, such as ground based sensors including radar, radio frequency, proximity, acoustic, thermal imaging, night vision, and global positioning system sensors.

In further example implementation, a system includes a video capture module and one or more processors configured to process a video data stream using a set of processing schemes to track one or more items of interest, where a performance score is associated with the confidence of each processing scheme to track the one or more items of interest, wherein an active processing scheme is repeatedly determined based on the processing scheme with the highest performance score from the set of processing schemes. In response to the performance score of the active processing scheme failing to satisfy a threshold, the one or more processors select another processing scheme to process the video data stream.

The system can include a sensor module, where the one or more processors are further configured to: monitor multiple regions of interest in video data stream; and in response to detecting a change in a region of interest, determine a response direction based on the sensor module, wherein the response direction indicates an approximate location for an item of interest. The sensor module can receive readings from at least one of a radar, a radio frequency, proximity, acoustic, thermal imaging, night vision, and global positioning system sensors. In response to detecting the change, the one or more processors are further configured to at least one of control a navigation system, an interface, and the video capture module based on the response direction.

BRIEF DESCRIPTION OF THE SEVERAL VIEWS OF THE DRAWINGS

The present disclosure is illustrated by way of examples, and not by way of limitation, and may be more fully understood with references to the following detailed description when considered in connection with the figures, in which.

DETAILED DESCRIPTION

The present innovation centers around the optimization of a spatial-temporal (spacio-temporal) awareness engine utilizing the limited resources available on an ARS. As used herein, "engine" refers to a logic processing loop that continually executes a transformation on a set of machine generated inputs to produce one or more outputs that are applied to operate the machine.

The spacio-temporal awareness engine utilizes a multi-camera view which is processed in parallel by a cascade of noise removal and super pixel feature consolidation and isolation algorithms to bring them to lower resolution images. These images are processed continuously using proprietary anomaly detection and populated in a probability distribution based priority quadtree and/or octree maps for further processing by the main high resolution tracking engine. An anomaly or change detection algorithm uses a combination of traditional edge and contour-based features in combination with a temporal prediction filter. The advantage of this two-tier architecture is the ability to reject and give prioritized areas for heavier, more computationally intensive algorithms.

On a fixed compute budget there is a negative relation between robustness of an algorithm and the cost and/or latency of the algorithm per spacio-temporal frame. Tight restrictions on available compute cycles limit the responsiveness of the system, especially on autonomous or semi-autonomous drones. By combining multiple algorithms in a way that achieves high combined frame rate with higher quality prediction, the system improves outcomes on a limited resource budget. Deep neural networks (DNN) may be executed to periodically detect objects and distinguish targets. A main high resolution tracking engine executes high-speed feature-based tracking based on disparity of similarity features with live adaptation.

In addition, the system employs color features and model predictions (Kalman/Particle filters etc.) to filter pixel domain inconsistencies. Once an object is detected in high-resolution mode (i.e. using DNN or manual input) a tracker algorithm takes control and maintains lock on the target. Applying different tracking algorithms and DNN based detections of a target in the video frame provides robustness at a high compute cost. A reduced resource background tracker may incrementally predict the location of a target in the frame with low compute cost and average robustness. This optimization enables the coexistent application of advanced machine vision algorithms in addition specialized lower cost algorithms.

Figure 1:
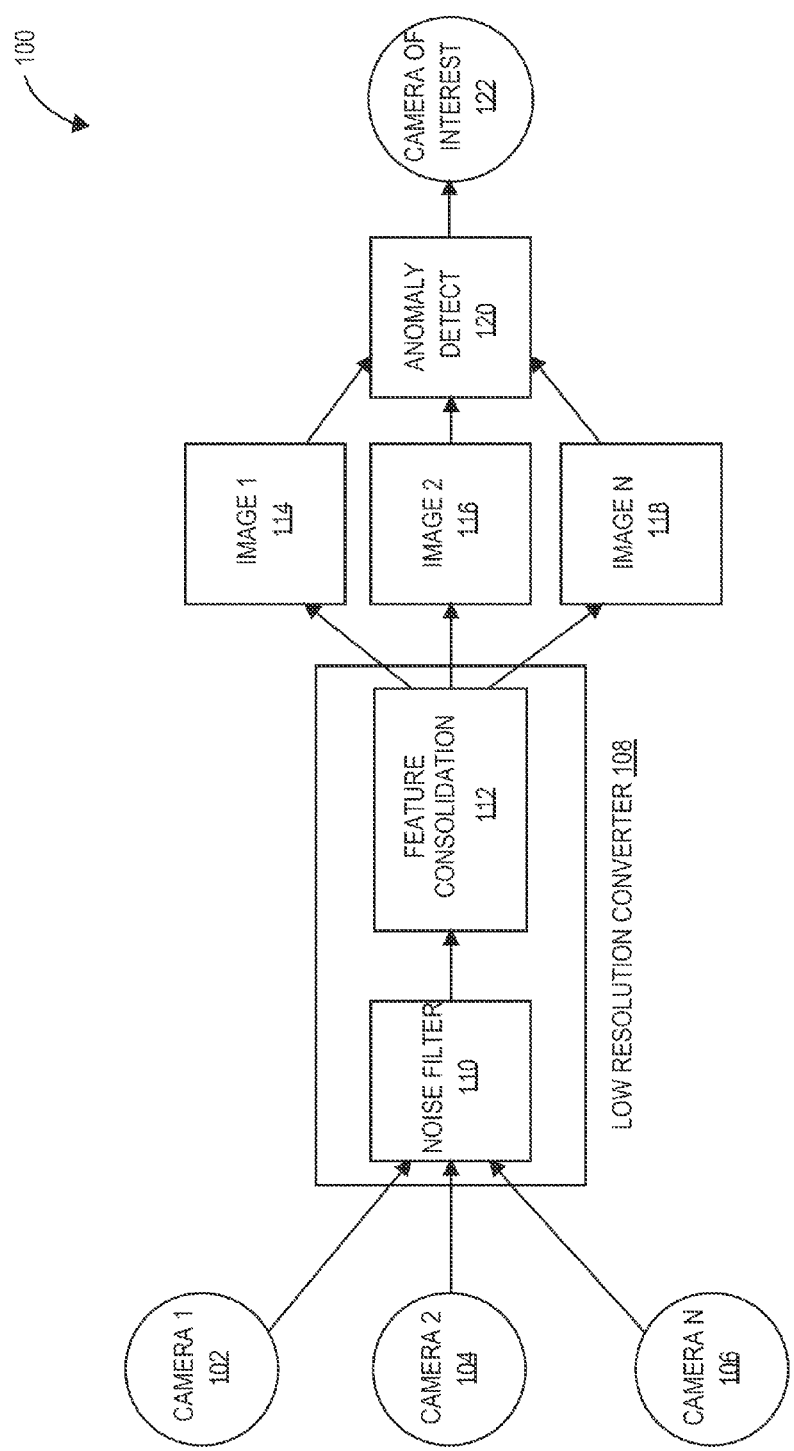
FIG. 1 illustrates an embodiment of a spacio-temporal awareness engine.

FIG. 1 illustrates an embodiment of a spacio-temporal awareness engine 100. The spacio-temporal awareness engine 100 comprises camera 1 102, camera 2 104, camera n 106, low resolution converter 108, image 1 114, image 2 116, image n 118, anomaly detect 120, and camera of interest 122. The low resolution converter 108 comprises the noise filter 110 and feature consolidation 112. The spacio-temporal awareness engine 100 may be operated in accordance with the tree based region selection process 200 and the tree-based region selection process 300.

Figure 2:
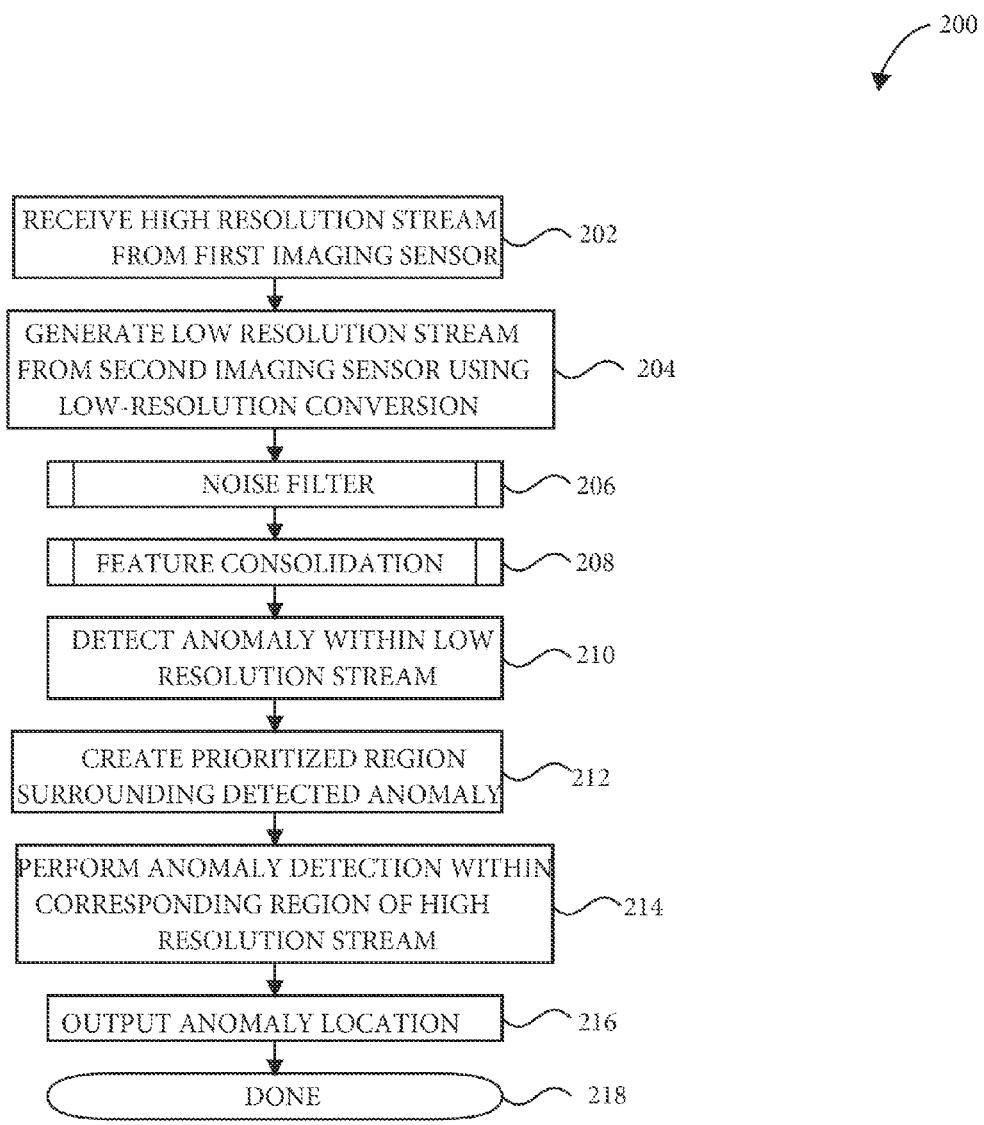
FIG. 2 illustrates an embodiment of a tree based region selection process.

Referring to FIG. 2, in block 202, tree based region selection process 200 receives a high resolution stream from a first imaging sensor. In block 204, tree based region selection process 200 generates a low resolution stream from a second imaging sensor using a low-resolution conversion. In subroutine block 206, tree based region selection process 200 noise filters. In subroutine block 208, tree based region selection process 200 feature consolidation. In block 210, tree based region selection process 200 detects an anomaly within the low resolution stream. In block 212, tree based region selection process 200 creates a prioritized region surrounding the detected anomaly. In block 214, tree based region selection process 200 performs anomaly detection within a corresponding region of the high resolution stream. In block 216, tree based region selection process 200 outputs the anomaly location. In done block 218, tree based region selection process 200 ends.

Figure 3:
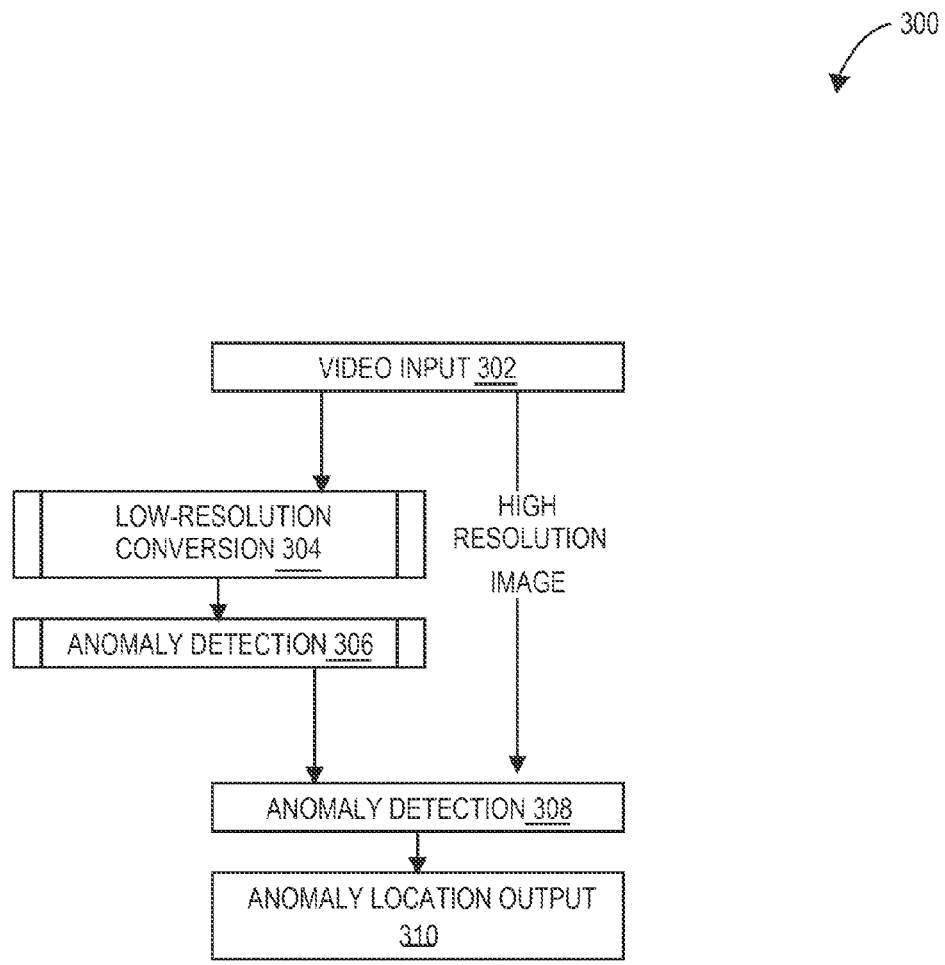
FIG. 3 illustrates an embodiment of a tree-based region selection process.

Referring to FIG. 3, in block 302, tree based tree-based region selection process 300 receives a video input from a plurality of cameras. In subroutine block 304, applies a low-resolution conversion. In subroutine block 306, the tree-based region selection process 300 detects anomalies in the video input. In block 308, the tree-based region selection process 300 detects anomalies within the region of interest in the high-resolution image. In block 310 the tree-based region selection process 300 outputs the anomaly location.

Figure 4:
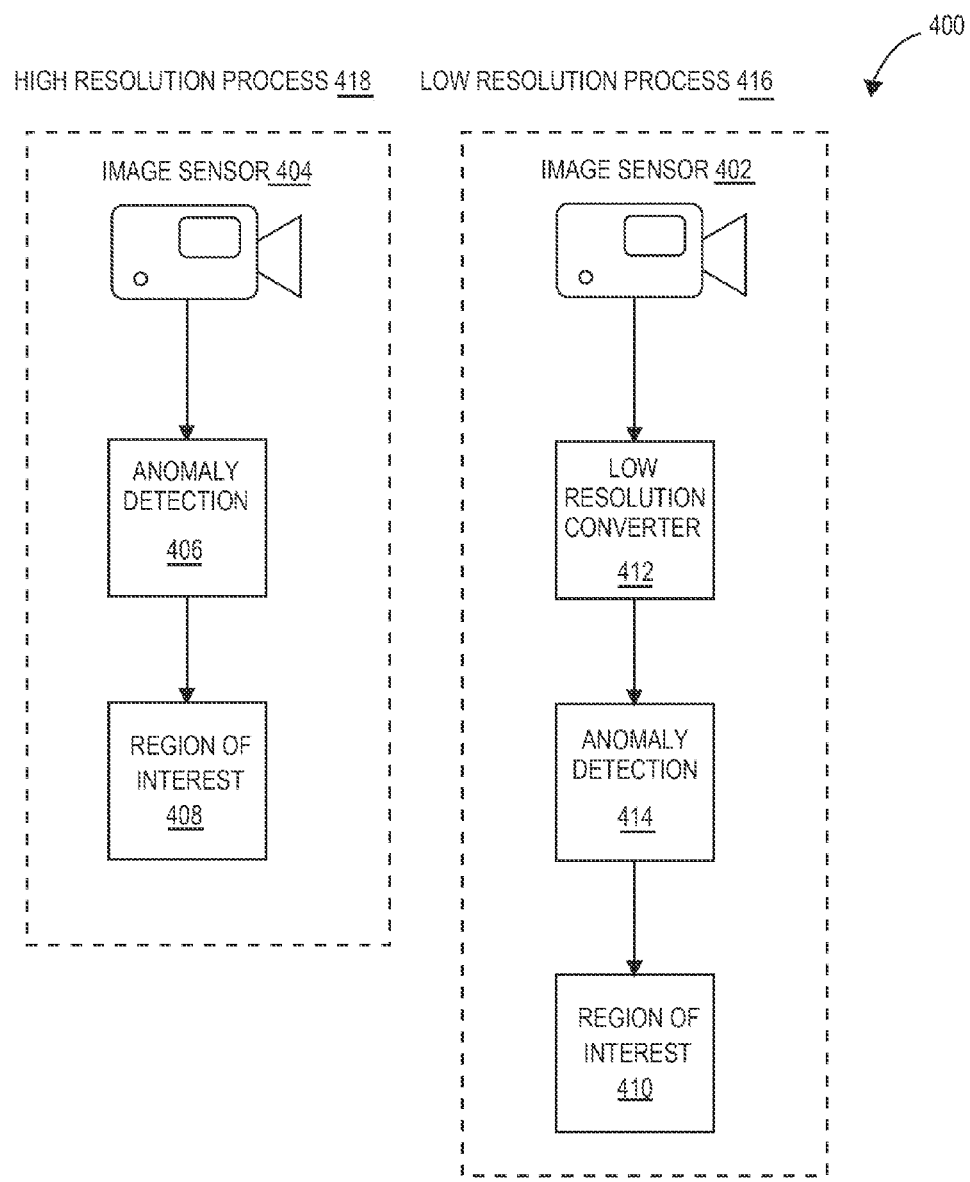
FIG. 4 illustrates an embodiment of a parallel image processing process.

FIG. 4 illustrates an embodiment of parallel image processing process 400. The parallel image processing process 400 comprises the high resolution process 418 and the low resolution process 416. The high resolution process 418 comprises image sensor 404, anomaly detection 406, and region of interest 408. The low resolution process 416 comprises the image sensor 402, the low resolution converter 412, the anomaly detection 414, and the region of interest 410.

Figure 5:
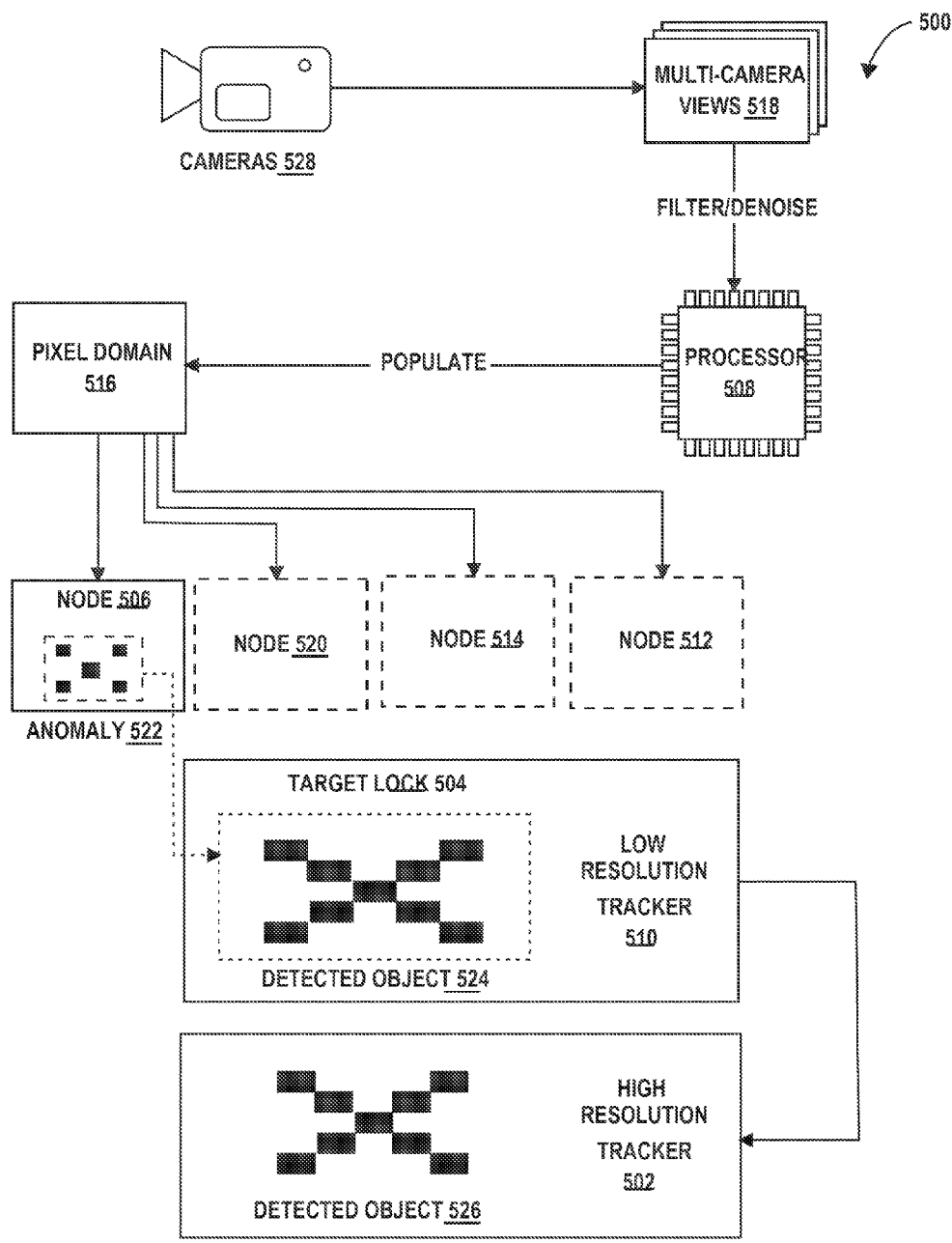
FIG. 5 illustrates a tracking system in accordance with one embodiment.

FIG. 5 illustrates a tracking system 500 in accordance with one embodiment. The tracking system 500 comprises a cameras 528 producing multi-camera views 518 that are input to a processor 508. The processor operates to filter and de-noise the multi-camera views 518 to populate a pixel domain 516. The pixel domain 516 is divided into nodes (e.g., node 506, node 520, node 514, and node 512 that are then analyzed by a high resolution tracker 502. Output of the high resolution tracker 502 is input to a fast, low power consumption low resolution tracker 510. In this example, the node 506 comprises an anomaly 522. The high resolution tracker 502 identifies the anomaly 522 as a detected object 524, which is then tracked by the low resolution tracker 510.

Figure 6:
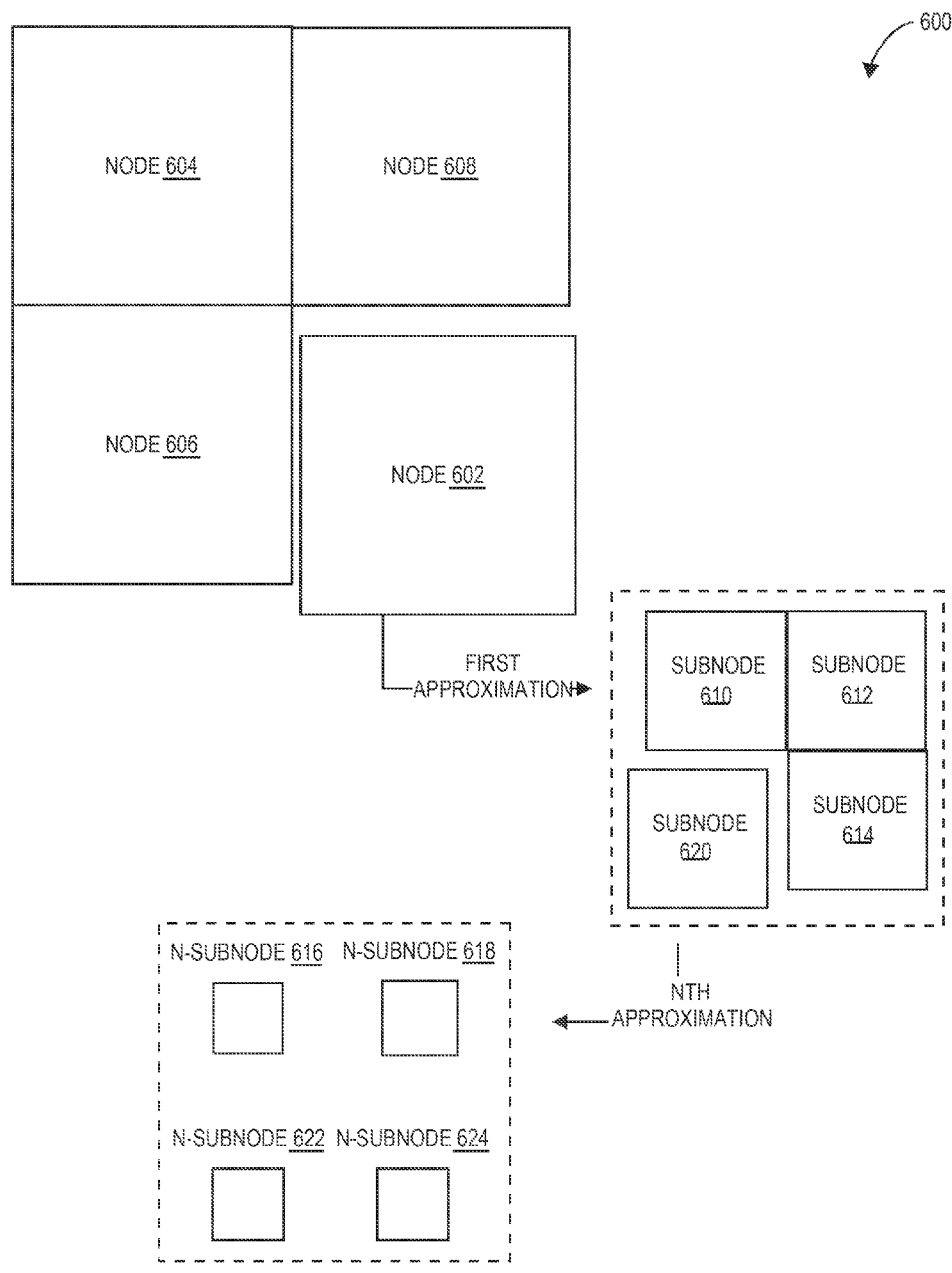
FIG. 6 illustrates an embodiment of a quadtree.

FIG. 6 illustrates an embodiment of a quadtree 600. The quadtree 600 comprises: node 604, node 608, node 606, subnode 610, subnode 612, subnode 614, n-subnode 616, n-subnode 618, n-subnode 622, and n-subnode 624.

Two dimensional areas are recursively subdivided into quarters. For example, node 602 may be divided into subnode 610, subnode 612, subnode 614, and subnode 620. Subnode 620 may be divided into n-subnode 616, n-subnode 618, n-subnode 622, and n-subnode 624. In this example, an input image is divided into node 604, node 608, node 606, and node 602. Based on a resolution and probability target, node 602 is selected as the most likely to contain the drone. Node 602 is then divided into subnode 610, subnode 612, subnode 620 and subnode 614, and the process is repeated n-times to an nth approximation until the resolution and probability target is reached. In this manner, a region of interest is determined.

Figure 7:
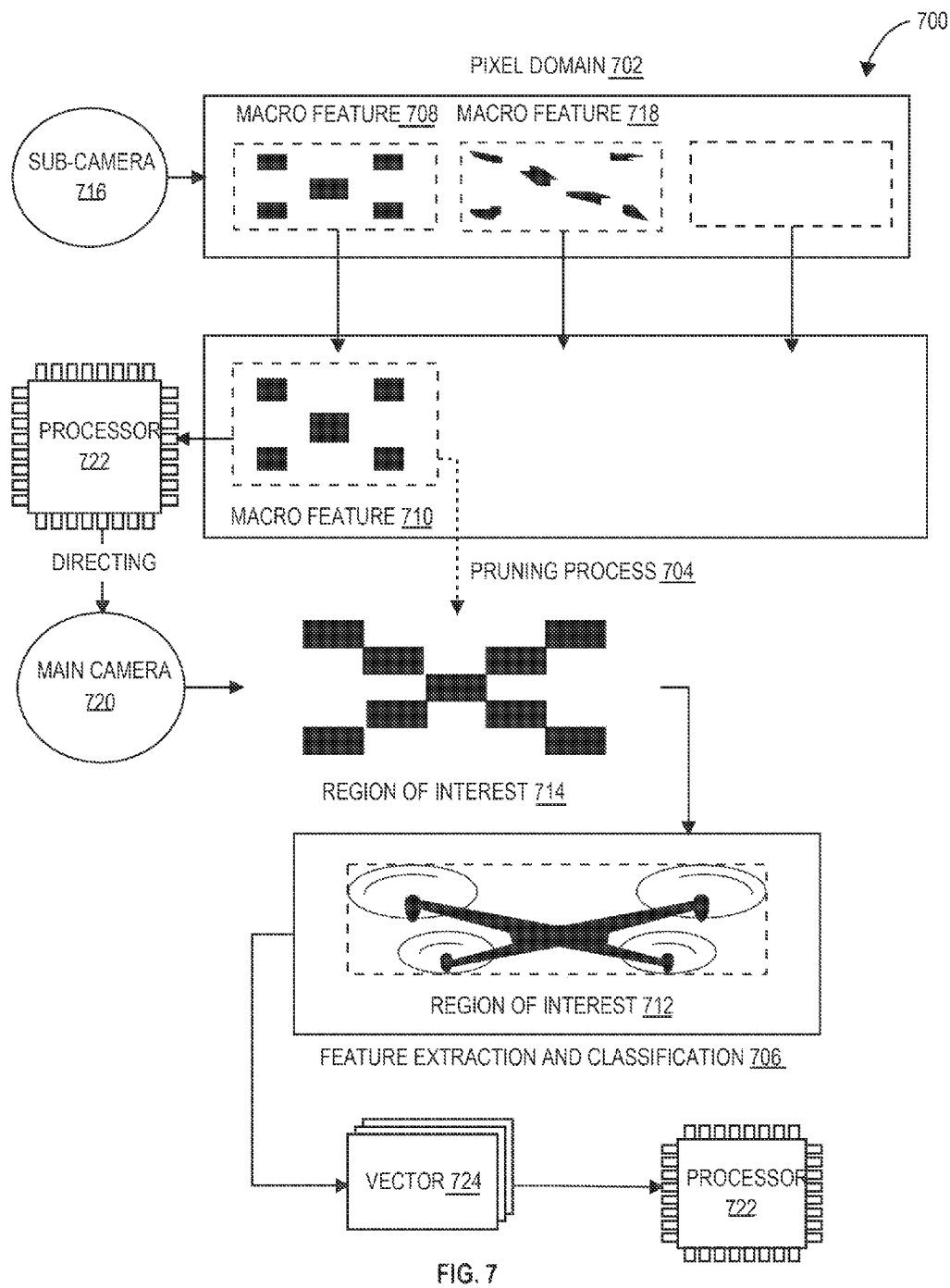
FIG. 7 illustrates an embodiment of a system for converting camera input into a vector.

FIG. 7 illustrates an embodiment of a system 700 for converting camera input into a vector for low resolution tracker 510. One of the system cameras (e.g., sub-camera 716) generates a pixel domain 702 image including sets of macrofeatures (e.g., macro feature 718 and macro feature 708). By operation of a processor 722, these undergo a pruning process 704 to generate more specific (pruned) macro features (e.g., macro feature 710). In this example, macro feature 718 was pruned as being characteristic of a non-target object (e.g., a bird in flight).

Primary macro features are identified from the pruned set as a region of interest 714 and vectorized (converted from the pixel domain to a vector or parameterized description) into a region of interest 712 using a feature extraction and classification 706 process. This results in a final vector 724 that may be applied to operate a mitigation system and direct the drone's main camera 720.

Figure 8:
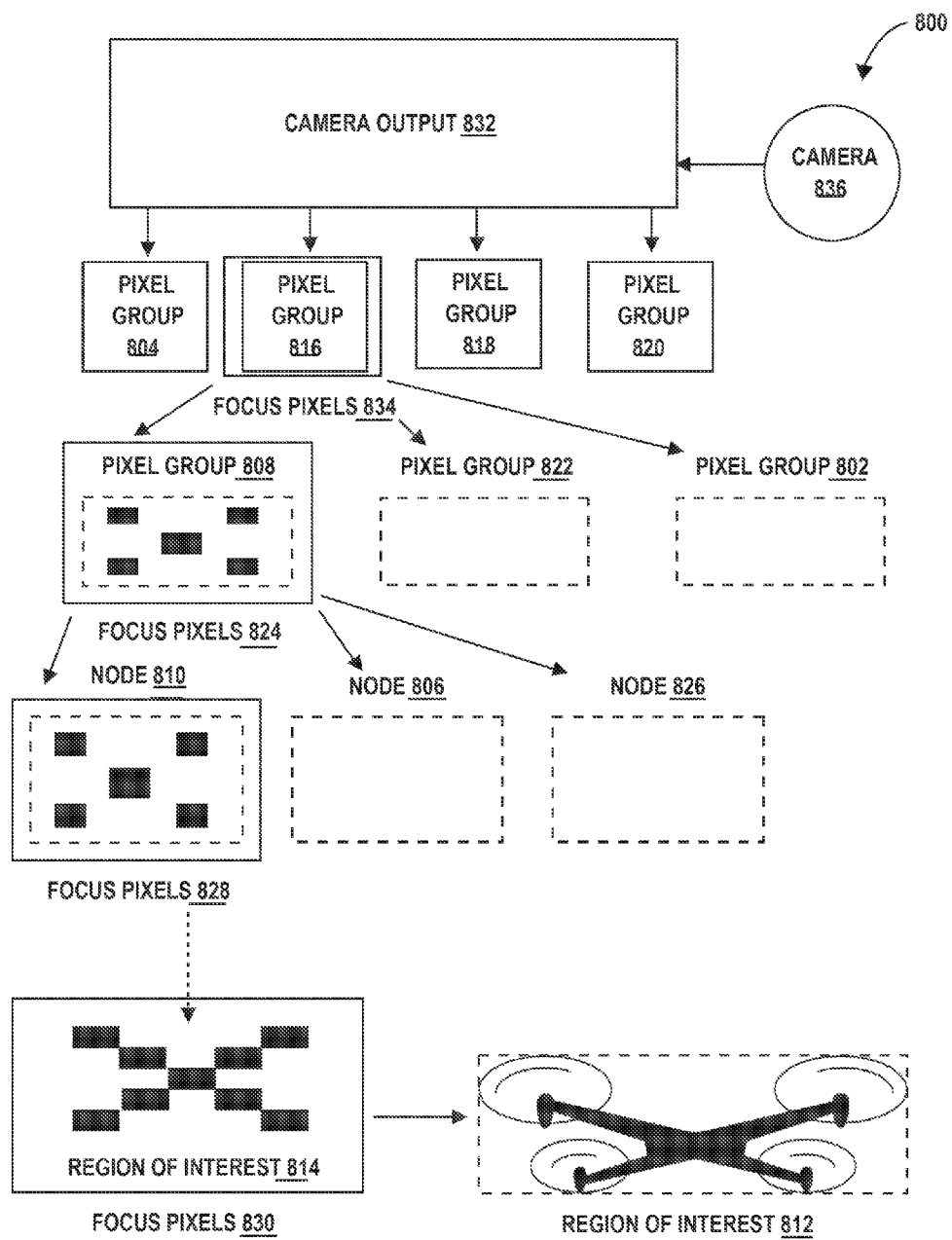
FIG. 8 illustrates an embodiment of a subsystem for prioritizing a region of interest.

FIG. 8 illustrates an embodiment of a subsystem 800 for prioritizing a region of interest in the focus of a camera. A camera 836 produces a camera output 832 that is divided into pixel groups (pixel group 804, pixel group 816, pixel group 818, and pixel group 820 in this example). The focus pixels 834 includes pixel group 816 that is divided into subgroups (pixel group 808, pixel group 822, pixel group 802, etc.) The focus pixels 824 include pixel group 808 which is divided into nodes (node 810, node 806, node 826 etc.) The focus pixels 828 includes node 810 from which the region of interest 814 is identified, and focused, to produce focused region of interest 812. In this manner, the focus of the camera 836 is progressively narrowed onto the eventual region of interest 812.

Figure 9:
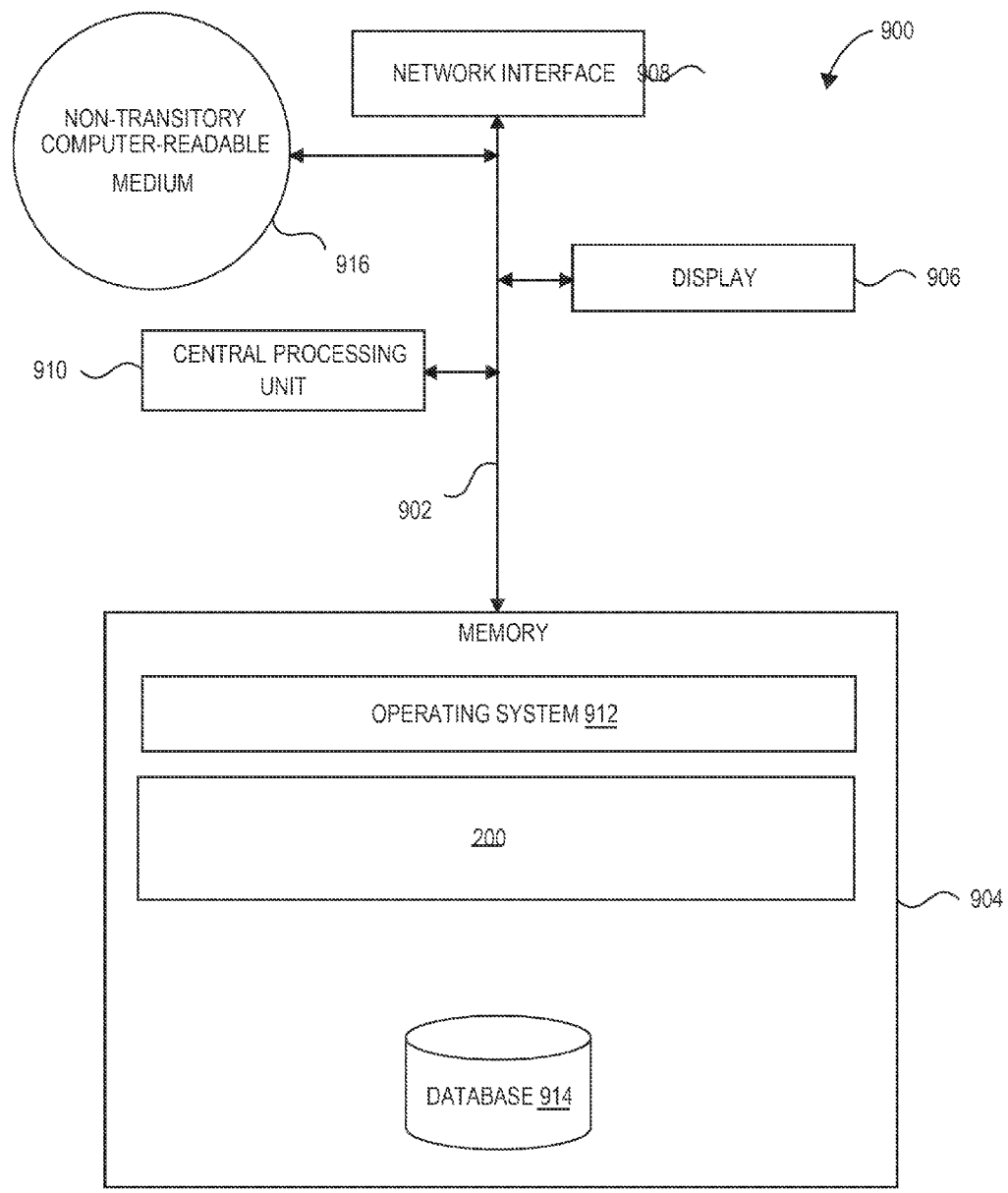
FIG. 9 illustrates a region of interest tracking system in accordance with one embodiment.

FIG. 9 illustrates several components of an exemplary region of interest tracking system 900 in accordance with one embodiment. The region of interest tracking system 900 may be included on a drone device (e.g., as a printed circuit board) to provide the capability to perform operations such as those described herein. In some embodiments, region of interest tracking system 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, the region of interest tracking system 900 may comprise one or more physical and/or logical devices that collectively provide the functionalities described herein. In some embodiments, the region of interest tracking system 900 may comprise one or more replicated and/or distributed physical or logical devices.

In some embodiments, the region of interest tracking system 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Region of interest tracking system 900 includes a bus 902 interconnecting several components including a network interface 908, a display 906, a central processing unit 910, and a memory 904. Memory 904 can comprises a random access memory ("RAM") and permanent non-transitory mass storage device, such as a hard disk drive or solid-state drive. Memory 904 stores an operating system 912. These and other software components may be loaded into a memory 904 of the region of interest tracking system 900 using a drive mechanism (not shown) associated with a non-transitory computer-readable medium 916, such as a memory card, or the like. Memory 904 also includes database 914. In some embodiments, region of interest tracking system 900 may communicate with database 914 via a network interface 908, a storage area network ("SAN"), a high-speed serial bus, and/or via the other suitable communication technology. In some embodiments, database 914 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

A multimodal sensor empowered awareness system for target recovery and object path prediction provides for a fast recovery of lost targets by empowering an autonomous robotic system (ARS) awareness engine with multimodal sensors. The system tracks targets visually using a combination of visual and acoustic tracking sensors.

The system employs a main tracking sensor (e.g. optical video) that feeds into a spatiotemoral engine on the ARS.

Proximal sensors complement the main tracking sensor. Using non-visual fast processing sensors that give rough directionality of the signal allows for prioritization of the visual target scanning process. The sensors may include sound, RF, LIDAR, RADAR, GPS, and potentially other proximity sensors that do not isolate the location of a possible target, but provide a general direction to be scanned as a priority. The system may thus implement multi-object path and collision prediction.

Figure 10:
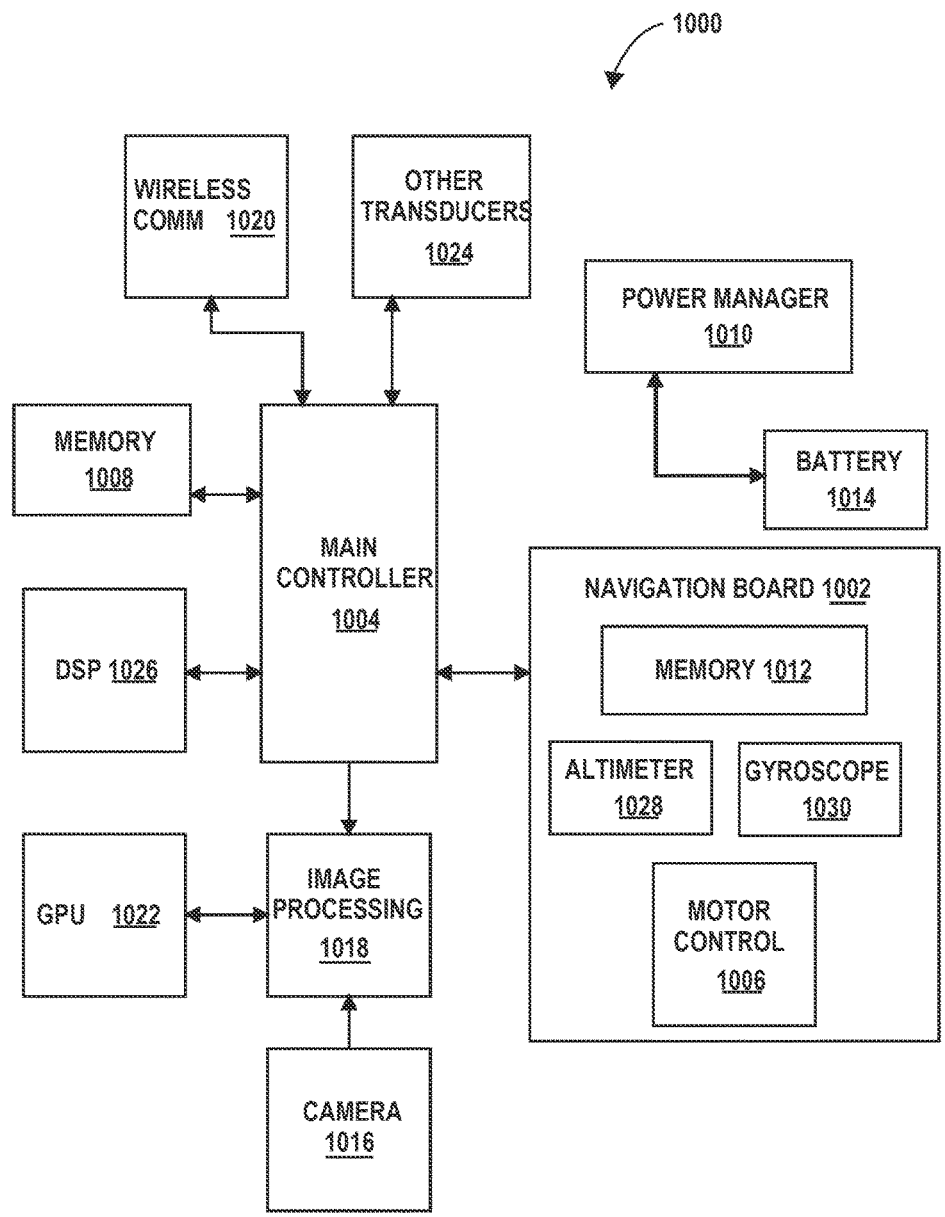
FIG. 10 illustrates an embodiment of drone operation logic.
Figure 11:
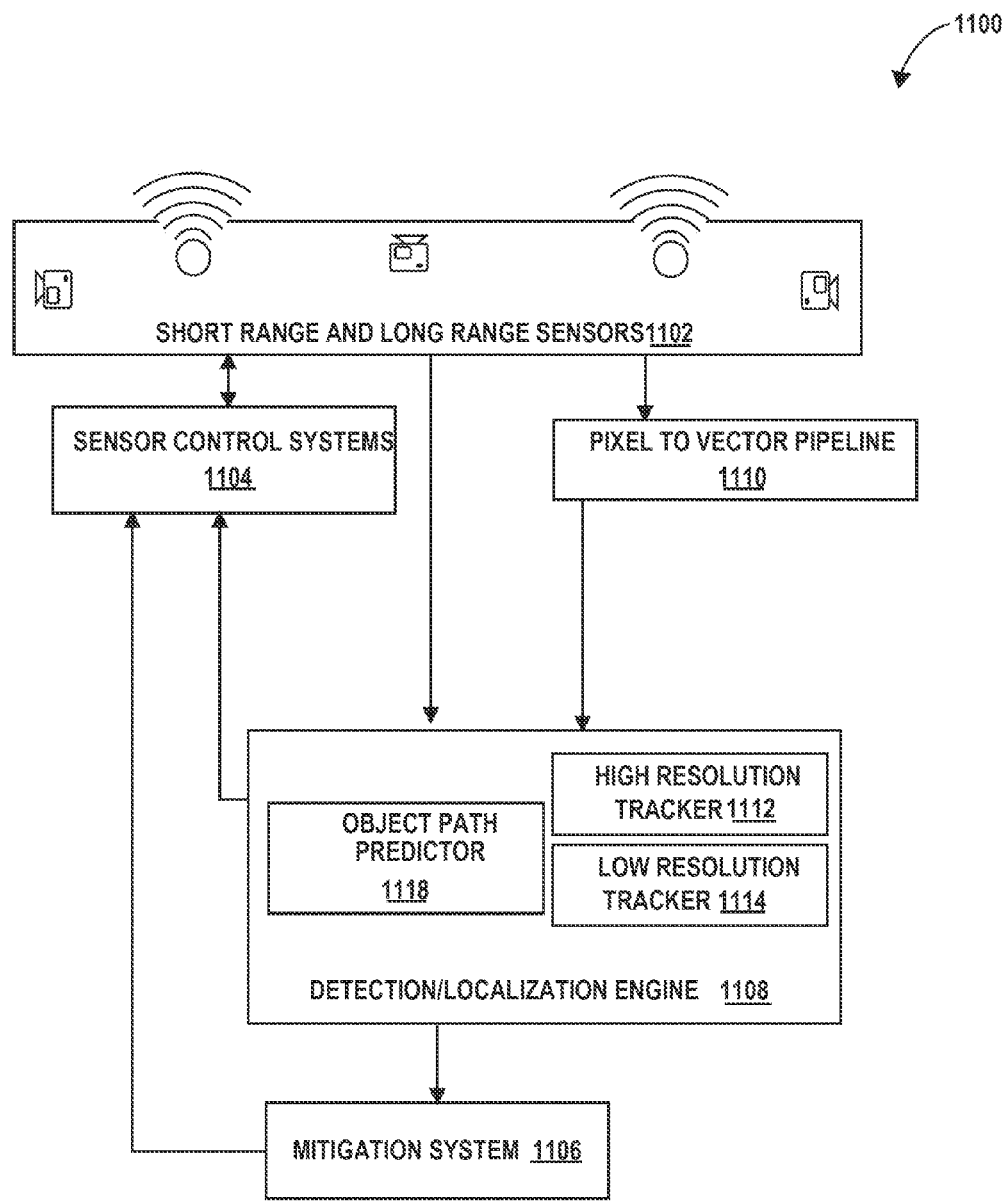
FIG. 11 illustrates an embodiment of a system operating a multimodal sensor empowered awareness engine.
Figure 12:
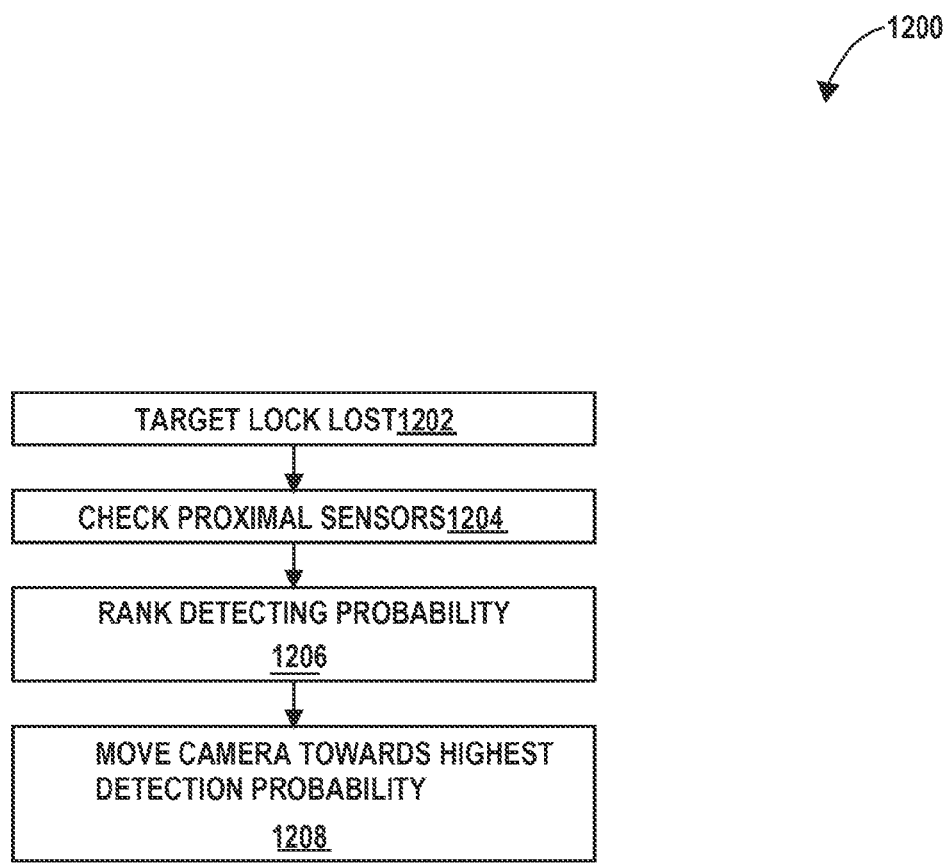
FIG. 12 illustrates an embodiment of a process for operating multimodal sensor empowered awareness engine.

The drone operation logic 1000 illustrated in FIG. 10 may be utilized to implement a system operating a multimodal sensor empowered awareness engine 1100 and a multimodal sensor empowered awareness engine 1200 as illustrated in FIG. 11 and FIG. 12, respectively.

Referring to FIG. 10, drone operation logic 1000 comprises a main controller 1004 that controls and coordinates the operation of other components as well as providing general computational capabilities (e.g., to execute image processing 1018). The main controller 1004 may comprise a central processing unit and/or one or more controllers or combinations of these components. The drone operation logic 1000 will typically comprise memory 1008 which may be utilized by the main controller 1004 and other components (e.g., the DSP 1026 and/or the GPU) to read and write instructions (commands) and data (operands for the instructions).

At least one camera 1016 may interface to image processing 1018 logic to record images and video from the environment. The image processing 1018 may operate to provide image/video enhancement, compression, feature extraction, and other transformations, and provide these to the main controller 1004 for further processing and storage to memory 1008. The image processing 1018 may further utilize a navigation board 1002 and/or DSP 1026 toward these ends. Images and video stored in the memory 1008 may also be read and processed by the main controller 1004, DSP 1026, and/or the GPU 1022. The drone operation logic 1000 may operate on power received from a battery 1014. The battery 1014 capability, charging, and energy supply may be managed by a power manager 1010.

The drone operation logic 1000 may transmit wireless signals of various types and range (e.g., cellular, WiFi, BlueTooth, and near field communication i.e. NFC) using the wireless communication logic 1020 and/or other transducers 1024. The drone operation logic 1000 may also receive these types of wireless signals. Wireless signals are transmitted and received using one or more antenna. Other forms of electromagnetic radiation may be used to interact with proximate devices, such as infrared (not illustrated). The drone operation logic 1000 may include a navigation board 1002 which includes a motor control 1006 using flight code (to operate propellers and/or landing gear), an altimeter 1028, a gyroscope 1030, and local memory 1012.

Referencing FIG. 11, a system operating a multimodal sensor empowered awareness engine 1100 comprises a short range and long range sensors 1102, a sensor control systems 1104, a pixel to vector pipeline 1110, a detection/localization engine 1108, and a mitigation system 1106. The detection/localization engine 1108 comprises an object path predictor 1118, high resolution tracker 1112, and a low resolution tracker 1114. The system operating a multimodal sensor empowered awareness engine 1100 may be operated in accordance with the process described in FIG. 12.

Referencing FIG. 12, a multimodal sensor empowered awareness engine 1200 detects that a lock on the tracked target has been lost (block 1202). The multimodal sensor empowered awareness engine 1200 checks the proximal sensors to identify the lost target (block 1204). The multimodal sensor empowered awareness engine 1200 ranks the probability of detecting the target based object path prediction (block 1206). The multimodal sensor empowered awareness engine 1200 moves the camera towards a proximal sensor with the highest detection probability (block 1208).

Figure 13:
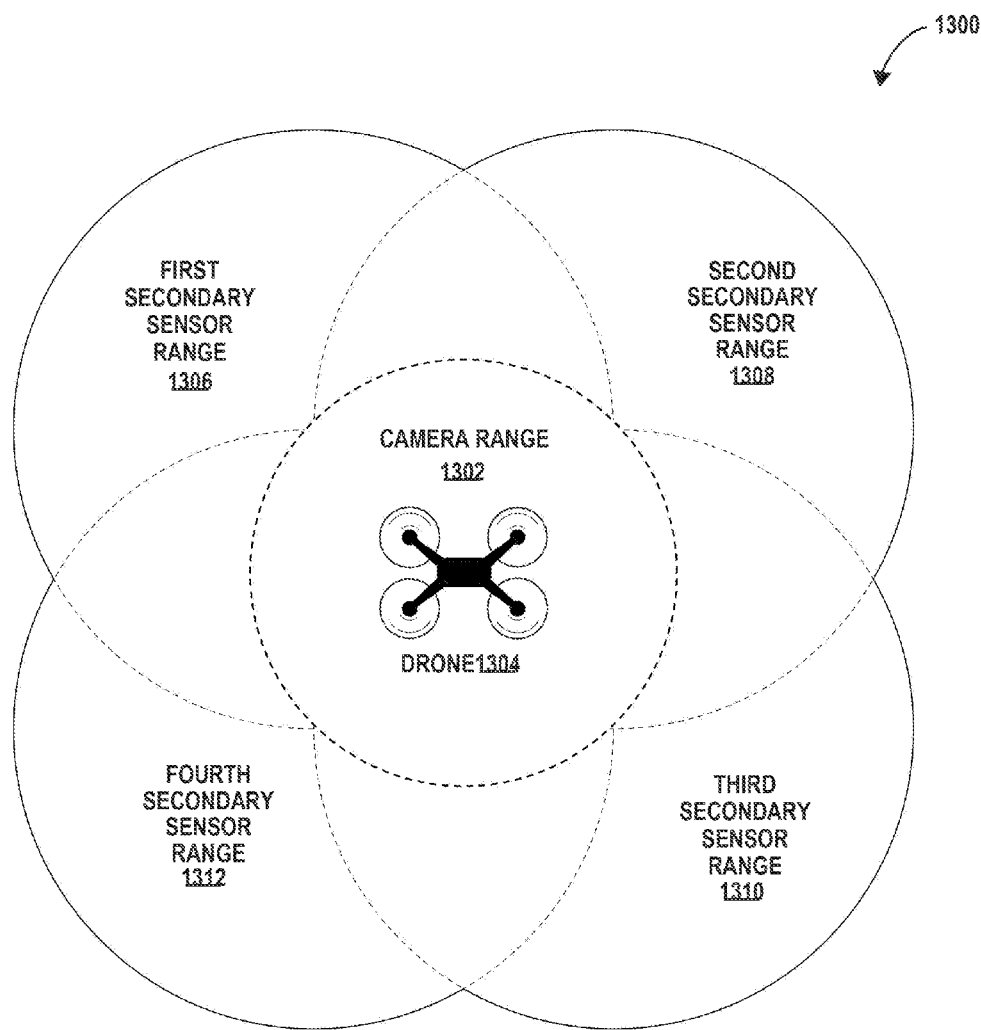
FIG. 13 illustrates an embodiment of a system operating a multimodal sensor empowered awareness engine.

Referencing FIG. 13, a system operating a multimodal sensor empowered awareness engine 1300 illustrates a drone 1304 comprising a camera range 1302 as the range of the main tracking sensor and a first secondary sensor range 1306, second secondary sensor range 1308, a third secondary sensor range 1310, and a fourth secondary sensor range 1312, as the range of the complementary proximal sensors.

Figure 14:
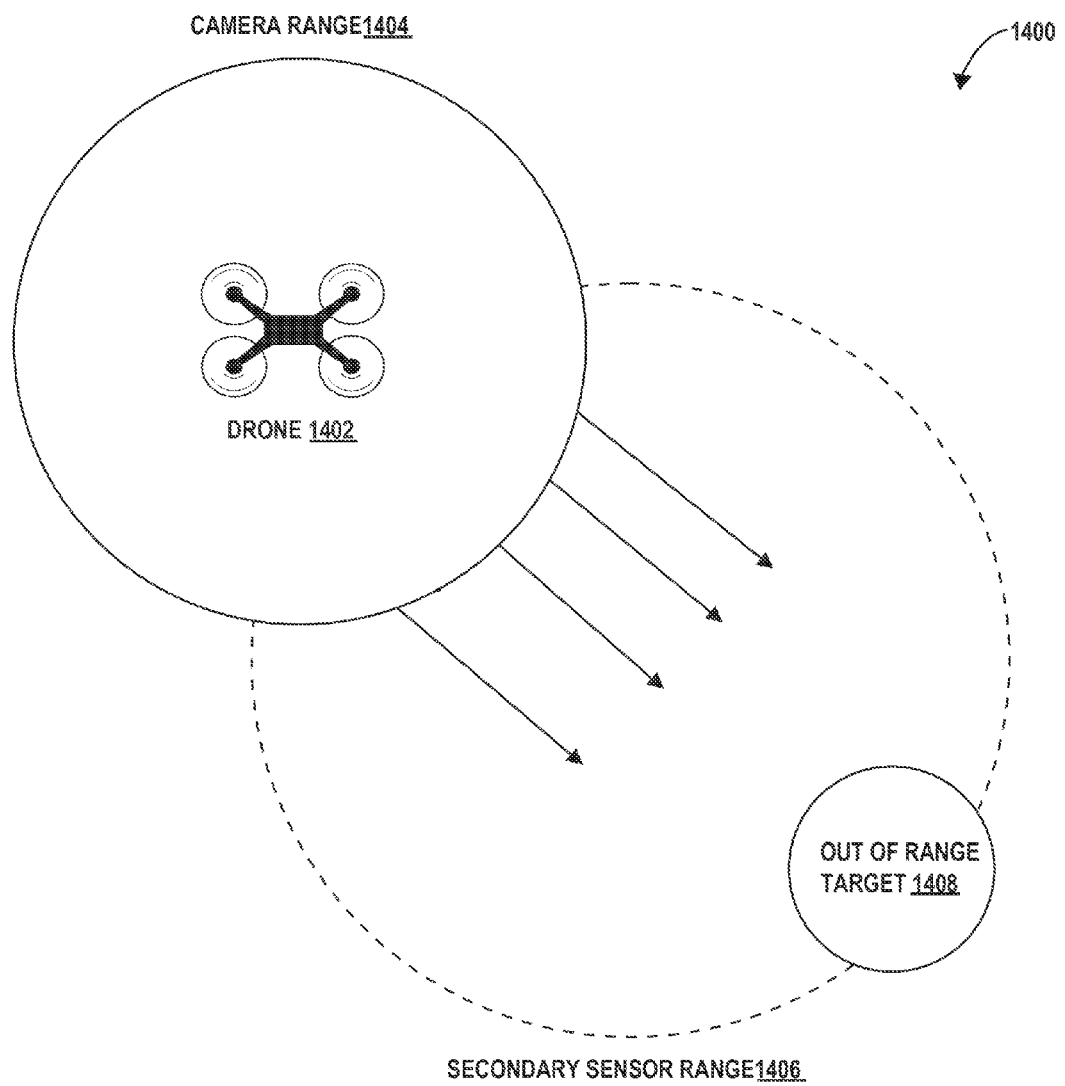
FIG. 14 illustrates an embodiment of a system operating a multimodal sensor empowered awareness engine.

Referencing FIG. 14, a system operating a multimodal sensor empowered awareness engine 1400 comprises a drone 1402 and an out of range target 1408 from a camera range 1404, in a secondary sensor range 1406.

An example aspect includes optimized video processing scheme scheduling. In an example implementation, processing schemes include localization algorithms that process video frames of one or more video data streams. The processing schemes produce a prediction of objects within the video fame, as well as a confidence number that as a measure of quality for that prediction. The confidence number can be normalized to a canonical range (0-1) and used to compare the confidence of each different processing scheme to track an item of interest.

Costs on all data inputs for the processing schemes can be pre-determined, estimated, or calculated. For example, a type of algorithm that operates on visual "features" can be dependent on the number of features in the video frame, and its cost estimated based the number of features. As the number of features increase the cost can increase dramatically.

According to other examples, algorithms may differ in their effectiveness based on the type of input received. Robustness of each algorithm (e.g., processing scheme) can be compared by measuring a population of inputs that are selected as representative of sample conditions (e.g., real-life data sets) and prioritized by an application requirements.

The example implementation can statically assign each processing scheme in a set of processing schemes to a group based on each processing scheme's determined cost and/or robustness estimations on the selected input group.

For example, processing schemes can be grouped as (i) High cost (low refresh rate), high robustness algorithm (e.g., processing schemes that produce an object location estimation independent of historical information).

(ii) Medium cost, medium robustness algorithms (e.g., processing schemes that use a last known location of the object location estimation and/or use a fast validation method to validate the estimation).

(iii) Low cost (high-refresh rate), low robustness algorithms (e.g., processing schemes that use a known location of the object location estimation and or a fast validation method to validate the estimation).

In an example implementation, a set of processing schemes (e.g., algorithms) are examined from group to group, and the process cycles through the processing scheme to produce a detection of an object. According to the example implementations, if the confidence number is higher than an activation number, an action is performed to stop or change a running group (i) and select or switch to group (ii). For example, a processing scheme from the group of (i) High cost (low refresh rate), high robustness algorithm can select a cheaper processing scheme from the group of (ii) Medium cost, medium robustness algorithms. Medium cost algorithms can be run from group (ii) in higher refresh rate, while monitoring the confidence level of the result.

According to an example implementation, a voting system is provided that fuses estimations from high confidence results, and validates the result with an independent validation method. If the confidence is below low threshold, falls outside of a range, or the validation method fails, group (i) processing is performed. If the confidence is determined to be high, then group (iii) algorithms can be applied to optimize resources. Different Groups of algorithms (e.g., group (iii) and group (ii)) may be similar and selected based different secondary factors to optimize local computing resources. For example, group (iii) algorithms may operate like group (ii) with a similar validation method but have secondary factors such as faster and more brittle performance.

In an example implementation, processing schemes may have no confidence measure and depend solely on the validation method to determine a performance score or detect a failure. For example, if the confidence is low in group (iii) or the validation method fails, group (ii) processing is selected to be the active processing scheme for processing the video data.

In some examples, the input can allow the system to invoke the group or processing scheme from the set of processing schemes that can detect the object, and constantly optimize the processing scheme that isolates the object from the background detected in the video data. For example, a processing scheme may more efficiently process video data to detect and track items from a white background.

Processing scheme examples for a group (i) High cost (low refresh rate)-high robustness can include modified tiny You only look once (YOLO) Convolutional Neural Networks (CNN) on 448 pixels input tiles in the frame; a modified SSD (Single Shot Detection) CNN on 300 pixels multi-scale classification; a modified Faster R-CNN (Region Proposal Networks), segmentation analysis of the frame+classifier for each candidate, etc.

Processing scheme examples for a group (ii) & (iii) can includes using SqueezeNet super fast rejection CNN as validation method on the estimated location produced by the algorithms. A 227 pixels input can be run in the location predicted by the algorithms and used as a part of the score for the result estimation. Group (ii) Medium cost-medium robustness processing scheme examples can include: color-based tracking-hue, saturation, value (HSV) channel statistical modeling; feature based tracking-Oriented FAST and rotated BRIEF (ORB) features+ descriptors, consensus of movement of keypoints (optical flow); movement based tracking-ego-motion compensation and background subtraction, etc.

Group (iii) Low-cost-low robustness processing scheme may have no confidence measure and depend solely on the validation method to determine a performance score and/or detect a failure. Group (iii) Low-cost-low robustness processing scheme processing scheme examples can include: extrapolation of location of object from past locations (e.g., no confidence measure (always max), depend on validation method to reject estimation, etc.); SqueezeNet super fast rejection CNN; template matching to the last known object appearance based on past detections, etc.

The foregoing algorithms are examples, and the present inventive concept is not limited thereto. Other example algorithms may be substituted therefor without departing from the inventive scope, as would be understood by those skilled in the art. References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones.

Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device.

Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed.

"Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware.

Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof.

Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method comprising:
processing a video data stream from a mobile capture device using a set of processing schemes to track one or more items of interest, wherein each processing scheme of the set of processing schemes to track the one or more items of interest is associated with a corresponding performance score that indicates a confidence in the corresponding processing scheme and a corresponding resolution, wherein an active processing scheme is repeatedly determined based on the processing scheme with the highest performance score from the set of processing schemes, wherein the set of processing schemes process the video data stream using different resolutions, wherein processing the video stream from the mobile capture device includes:
modifying a resolution of the video data stream until a probability target is achieved, wherein the probability target is associated with a region of interest indicated to likely to contain an item of interest; and
detecting the item of interest in the region of interest, wherein the resolution of the video data stream is converted from a first resolution to a lower second resolution in response to a determination that the item of interest is detected using the video data stream in the first resolution that is higher than the second resolution; and
tracking the item of interest using the video data stream in the second resolution.

2. The method of claim 1, wherein in response to the corresponding performance score of the active processing scheme failing to satisfy a threshold, selecting another processing scheme to process the video data stream.

3. The method of claim 1, further comprising selecting another processing scheme based on determining a number of items of interest in the video data stream.

4. The method of claim 1, wherein the set of processing schemes utilize different resource levels to process the video data stream.

5. The method of claim 1, wherein processing the video data stream comprises:
identifying one or more items;
classifying each of the items; and
determining to track one or more of the items as the item of interest based on the classification.

6. The method of claim 1, wherein the corresponding performance scores are re-calculated based on a trigger, a resource threshold, or a time interval.

7. The method of claim 1, wherein processing the video data stream comprises at least one of noise filtering and feature consolidation.

8. The method of claim 2, wherein the threshold is based on available computing resources associated with the mobile capture device.

9. An autonomous robotic system comprising:
a video capture module;
one or more processors configured to:
process a video data stream from the video capture module using a set of processing schemes to track one or more items of interest, wherein each of the processing schemes of the set of processing schemes to track the one or more items of interest is associated with a corresponding performance score that indicates a confidence in the corresponding processing scheme and a corresponding resolution, wherein an active processing scheme is repeatedly determined based on the processing scheme with the highest performance score from the set of processing schemes, wherein the set of processing schemes process the video data stream using different resolutions, wherein to process the video data stream from the video capture module, the processor is further configured to:
modify a resolution of the video data stream until a probability target is achieved, wherein the probability target is associated with a region of interested indicated to likely contain an item of interest; and
detect the item of interest in the region of interest, wherein the resolution of the video data stream is converted from a first resolution to a lower second resolution in response to a determination that the item of interest is detected using the video data stream in the first resolution that is higher than the second resolution, wherein the one or more processors is configured to control at least one of a navigation system, an interface, and the video capture module in response to detecting the item of interest in the region of interest; and
track the item of interest using the video data stream in the second resolution.

10. The system of claim 9, wherein in response to the corresponding performance score of the active processing scheme failing to satisfy a threshold, the one or more processors select another processing scheme to process the video data stream.

11. The system of claim 9, further comprising a sensor module, wherein the one or more processers are further configured to:
monitor multiple regions of interest in the video data stream; and
in response to detecting a change in a region of interest, determine a response direction based on the sensor module, wherein the response direction indicates an approximate location for an item of interest.

12. The system of claim 11, wherein the sensor module comprises readings from at least one of a radar, a radio frequency, proximity, acoustic, thermal imaging, night vision, and global positioning system sensors.

13. The method of claim 1, wherein the set of processing schemes include at least one of producing an object location estimation independent of historical information, using a last known location of an object location estimation and using a fast validation method to validate the estimation, and using a known location of the object location estimation and/or a fast validation method to validate the estimation.

14. The system of claim 9, wherein the set of processing schemes include at least one of producing an object location estimation independent of historical information, using a last known location of an object location estimation and using a fast validation method to validate the estimation, and using a known location of the object location estimation and/or a fast validation method to validate the estimation.

15. A computer program product being embodied on a non-transitory computer readable medium and comprising computer instructions for:
processing a video data stream from a mobile capture device using a set of processing schemes to track one or more items of interest, wherein each processing scheme of the set of processing schemes to track the one or more items of interest is associated with a corresponding performance score that indicates a confidence in the corresponding processing scheme and a corresponding resolution, wherein an active processing scheme is repeatedly determined based on the processing scheme with the highest performance score from the set of processing schemes, wherein the set of processing schemes process the video data stream using different resolutions, wherein processing the video stream from the mobile capture device includes:
modifying a resolution of the video data stream until a probability target is achieved, wherein the probability target is associated with a region of interest indicated to likely to contain an item of interest; and
detecting the item of interest in the region of interest, wherein the resolution of the video data stream is converted from a first resolution to a lower second resolution in response to a determination that the item of interest is detected using the video data stream in the first resolution that is higher than the second resolution; and
tracking the item of interest using the video data stream in the second resolution.

16. The system of claim 9, wherein the one or more processors are further configured to select another processing scheme based on determining a number of items of interest in the video data stream.

17. The system of claim 9, wherein the set of processing schemes utilize different resource levels to process the video data stream.

18. The system of claim 9, wherein the process the video data stream, the one or more processors are further configured to:
identify one or more items;
classify each of the items; and
determine to track the one or more items as the item of interest based on the classification.

19. The system of claim 9, wherein the corresponding performance scores are re-calculated based on a trigger, a resource threshold, or a time interval.

20. The system of claim 9, wherein to process the video data stream comprises at least one of noise filtering and feature consolidation.

21. The system of claim 10, wherein the threshold is based on available computing resources associated with the mobile capture device.

* * * * *